June 2, 1942.  C. E. COCHRAN  2,285,251
INDUSTRIAL TRUCK
Filed Feb. 19, 1941  2 Sheets-Sheet 1

INVENTOR.
Clyde E. Cochran
BY
Fay, Macklin, Gohrick and Williams
ATTORNEYS.

Patented June 2, 1942

2,285,251

UNITED STATES PATENT OFFICE 2,285,251

INDUSTRIAL TRUCK

Clyde E. Cochran, Cleveland, Ohio, assignor to The Elwell-Parker Electric Company Application February 19, 1941, Serial No. 379,616

9 Claims. (Cl. 187—9)

This invention relates, as indicated, to industrial trucks, but has reference more particularly to trucks of this type in which the lift platform has a relatively short range of movement.

A primary object of the invention is to provide mechanism for elevating and lowering the platform, which mechanism is especially adaptable in situations where the platform needs to have imparted thereto only a relatively short range of movement.

A further object of the invention is to provide mechanism of the character described which can be installed in a relatively small space in the truck, which is economical to build and install, and the use of which obviates the necessity of using complicated levers and linkage which are conventionally used for elevating and lowering the platform.

Other objects and advantages of the invention will be apparent during the course of the following description.

In the accompanying drawings, forming a part of this specification, and in which like numerals are employed to designate like parts throughout the same, Fig. 1 is a fragmentary side elevation of an industrial truck having incorporated therein the novel features of the invention.

Figure 1:
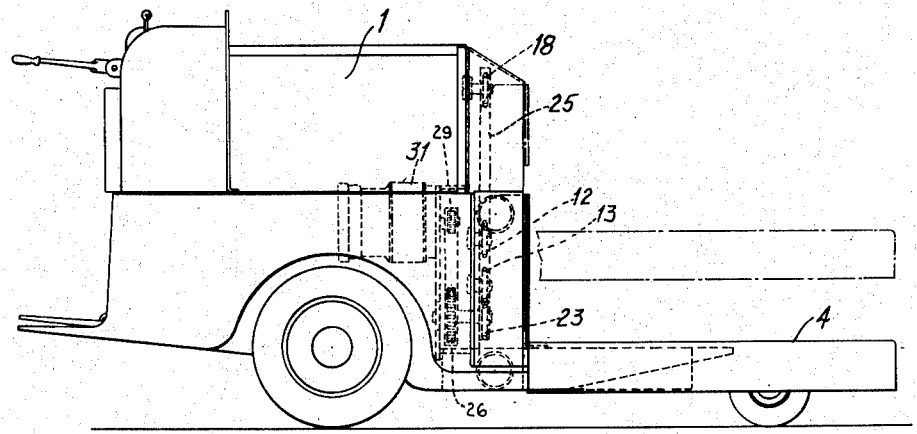

Referring more particularly to the drawings, the truck will be seen to comprise a body 1, the chassis or frame of which includes spaced parallel stationary plates 2 and 3, upon which the mechanism to be presently described is supported, and a platform 4 which is adapted to be elevated and lowered relatively to the body of the truck. The platform is rigidly supported upon a framework which includes a plate 5 parallel with the plates 2 and 3.

Rigidly secured within vertically spaced openings in the plate 5 as by means of retainer plates 6 and bolts 7, are bearings 8 and 9, in which are journalled stub shafts 10 and 11. The shafts 10 and 11 have rigidly secured thereto sprockets 12 and 13 respectively.

Rigidly secured within transversely spaced openings in the plate 3, as by means of retainer plates 14 and bolts 15, are bearings 16, in which are journalled stub shafts 17, to which, in turn, platform lifting sprockets 18 are rigidly secured.

Rigidly secured within laterally spaced openings in the plate 3, as by means of retainer plates 19 and bolts 20, are bearings 21, in which are journalled stub shafts 22, to which, in turn, idler sprockets 23 and 24 having equal numbers of teeth are respectively rigidly secured.

Figures 3, 4, 5:
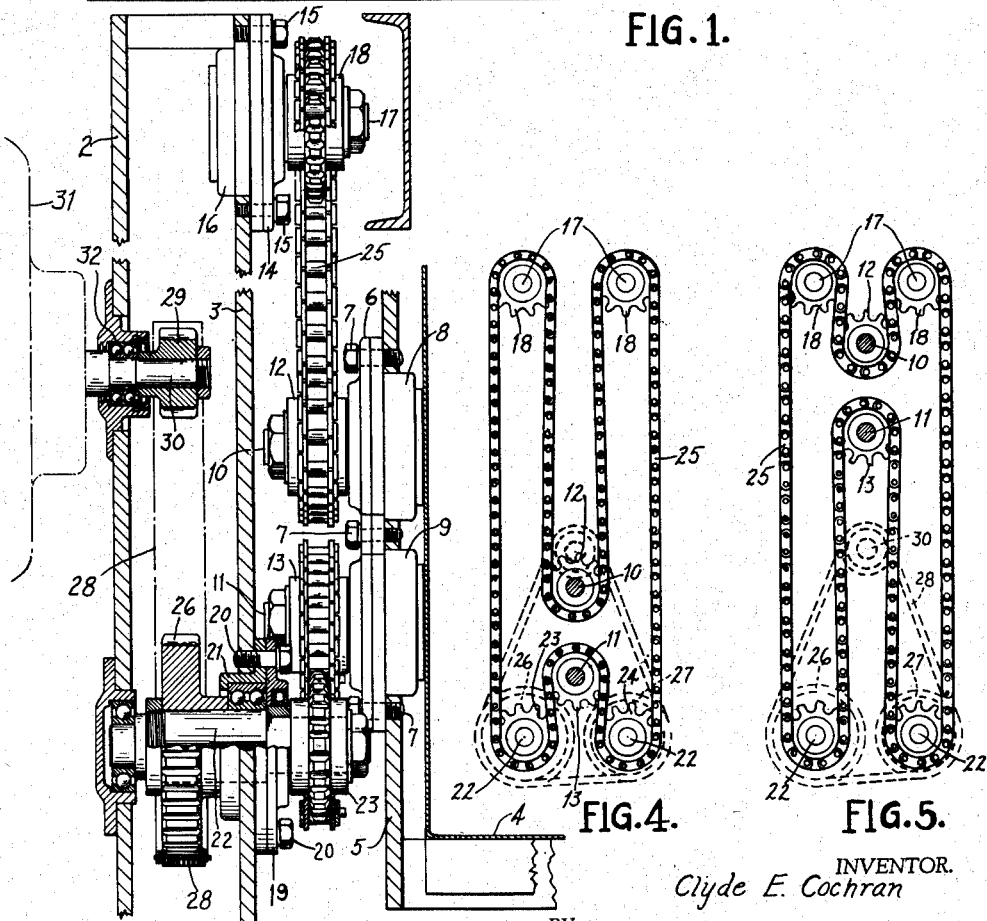
Fig. 3 is a fragmentary vertical cross-sectional view of the aforesaid mechanism, taken on the line 3—3 of Fig. 2.
Fig. 4 is a view showing the relation of the parts of the aforesaid mechanism when the platform of the truck is in its lowermost position.
Fig. 5 is a view showing the relation of the parts of the aforesaid mechanism when the platform of the truck is in its uppermost position.
Figure 2:
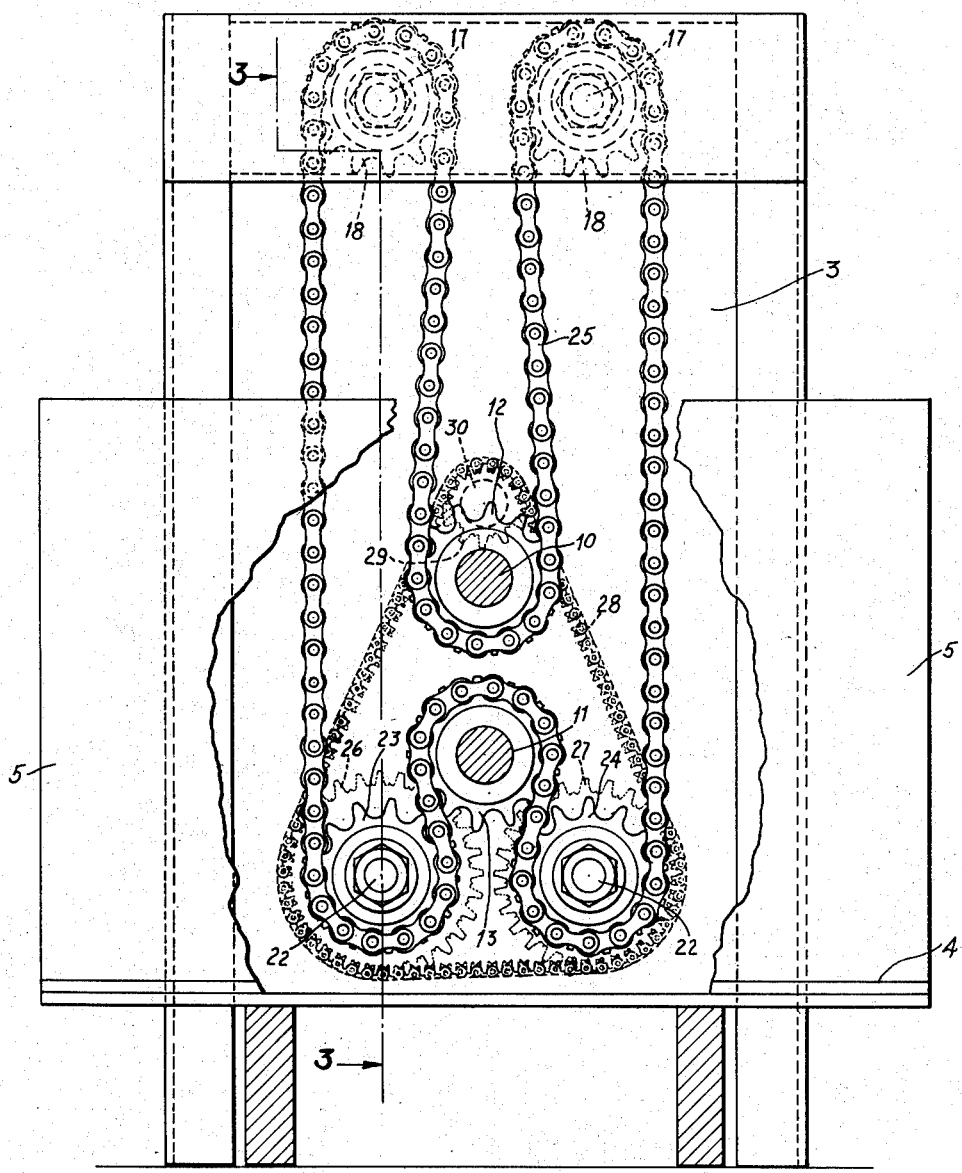
Fig. 2 is an elevational view of the differential hoisting and lowering mechanism for the platform of said truck.

For the purpose of simultaneously driving all of the aforesaid sprockets, an endless chain 25 is provided, which is preferably of the conventional roller chain type, and which is wound around the sprockets in the manner clearly shown in Figs. 2, 4 and 5.

In order to drive the chain 25, the stub shafts 22 have rigidly secured thereto gears 26 and 27 having unequal numbers of teeth, which are driven by an endless belt gear 28, which, in turn, is driven by a pinion 29. The pinion 29 is mounted on the shaft 30 of an electric motor 31, the shaft 30 being journalled in a bearing 32 secured within an opening in the plate 2.

As a practical application of the invention, the gear 26 in one case had 41 teeth and a pitch diameter of 6.53 inches and the gear 27 had 39 teeth and a pitch diameter of 6.21 inches. In the operation of the mechanism, when the motor 31 is started, the platform 4 will move upwardly or downwardly, depending upon the direction of rotation of the motor, due to the differential motion resulting from the difference in the number of teeth between the gears 26 and 27. The peripheral speeds of the sprockets 26 and 27 at their respective pitch diameters will, of course, be equal, but due to the unequal number of teeth in these gears, the number of revolutions per minute of these gears will not be equal. Thus the revolutions per minute will be different for the sprockets 23 and 24 which are driven respectively by gears 26 and 27 through the stub shafts 22.

The differential hoisting and lowering mechanism which has been described is particularly adaptable for use in industrial trucks in which it is necessary to impart to the platform a relatively short motion or lift. Moreover, its installation in a truck requires very little space, it is economical to build and install, and its use obviates the necessity of using complicated levers and linkage which are conventionally used for elevating and lowering the platform.

It is to be understood that the invention is not limited in respect to the specific differential between the number of teeth in the gears 26 and 27, to which reference has been made.

It is to be further understood that the form of my invention, herewith shown and described, is to be taken as a preferred example of the same, and that various changes in the shape, size and arrangement of parts may be resorted to, without departing from the spirit of my invention, or the scope of the subjoined claims.

The term "sprocket," as hereinafter used, is intended to broadly designate any toothed element, such as a sprocket, gear, pinion or the like.

Having thus described my invention, I claim:

1. In an industrial truck, a platform, and differential hoist means for elevating and lowering said platform relatively to said truck, said means comprising a pair of rotatable elements, one of which rotates at a different speed than the other, and means for simultaneously rotating said elements.

2. In an industrial truck, a platform, and differential hoist means for elevating and lowering said platform relatively to said truck, said means comprising a pair of driven gears mounted on said truck, one of said gears having a different number of teeth than the other, a pair of idler sprockets driven by said gears and carried by said truck, a pair of vertically spaced sprockets carried by said platform, and an endless driving element in driving engagement with all of said sprockets.

3. In an industrial truck, a platform, and differential hoist means for elevating and lowering said platform relatively to said truck, said means comprising a pair of driven gears mounted on said truck in laterally spaced relation to each other, one of said gears having a different number of teeth than the other, a pair of idler sprockets driven by said gears and carried by said truck, a pair of platform lifting sprockets carried by said truck in laterally spaced relation above said first named sprockets, a pair of sprockets carried by said platform in vertically-spaced relation, and an endless driving element in driving engagement with all of said sprockets.

4. In an industrial truck, a platform, and differential hoist means for elevating and lowering said platform relatively to said truck, said means comprising a pair of driven gears mounted on said truck in laterally spaced relation to each other, one of said gears having a different number of teeth than the other, a pair of idler sprockets driven by said gears and carried by said truck, a pair of platform lifting sprockets carried by said truck in laterally spaced relation above said first-named sprockets, a pair of sprockets carried by said platform in vertically-spaced relation, all of said sprockets being substantially coplanar, an endless driving chain in driving engagement with all of said sprockets, an electric motor carried by said truck, and means for driving said first-named sprockets from said motor.

5. In an industrial truck, a platform, and differential hoist means for elevating and lowering said platform relatively to said truck, said means comprising a pair of rotatable elements, one of which rotates at a different speed than the other, both of said elements being disposed in a common plane transversely of said truck, thereby to reduce the over-all length of the frame, and means for simultaneously rotating said elements.

6. In an industrial truck, a platform, and differential hoist means for elevating and lowering said platform relatively to said truck, said means comprising a pair of equal sized sprockets, having different angular velocities, and an endless chain for simultaneously rotating said sprockets, said sprockets and said chain being disposed in a common plane transversely of said truck.

7. In an industrial truck, a platform and differential hoist means for elevating and lowering said platform relatively to said truck, said means comprising a pair of driven sprockets of equal size mounted on said truck, means for driving said sprockets at unequal angular velocities, a pair of platform lifting sprockets carried by said truck, a pair of vertically spaced sprockets carried by said platform and an endless driving element in driving engagement with all of said sprockets.

8. In an industrial truck, a platform and differential hoist means for elevating and lowering said platform relatively to said truck, said means comprising a pair of driven sprockets in laterally spaced relation to each other, means for driving said sprockets at unequal angular velocities, a pair of platform lifting sprockets carried by said truck in laterally spaced relation above said first-named sprockets, a pair of sprockets carried by said platform in vertically spaced relation, an endless driving element in driving engagement with said sprockets.

9. In an industrial truck, a platform, and differential hoist means for elevating and lowering said platform relatively to said truck, said means comprising a pair of driven sprockets mounted on said truck in laterally spaced relation to each other, means for driving said sprockets at unequal angular velocities, a pair of platform lifting sprockets carried by said truck in laterally spaced relation above said first-named sprockets, a pair of sprockets carried by said platform in vertically spaced relation, all of said sprockets being substantially co-planar, an endless driving chain in driving engagement with all of said sprockets, an electric motor carried by said truck, and means for connecting said driving means to said motor.

CLYDE E. COCHRAN.